E. ALDERS.
EXTENSION PLOW ATTACHMENT FOR CULTIVATORS.
APPLICATION FILED MAR. 21, 1911.
1,007,764.
Patented Nov. 7, 1911.
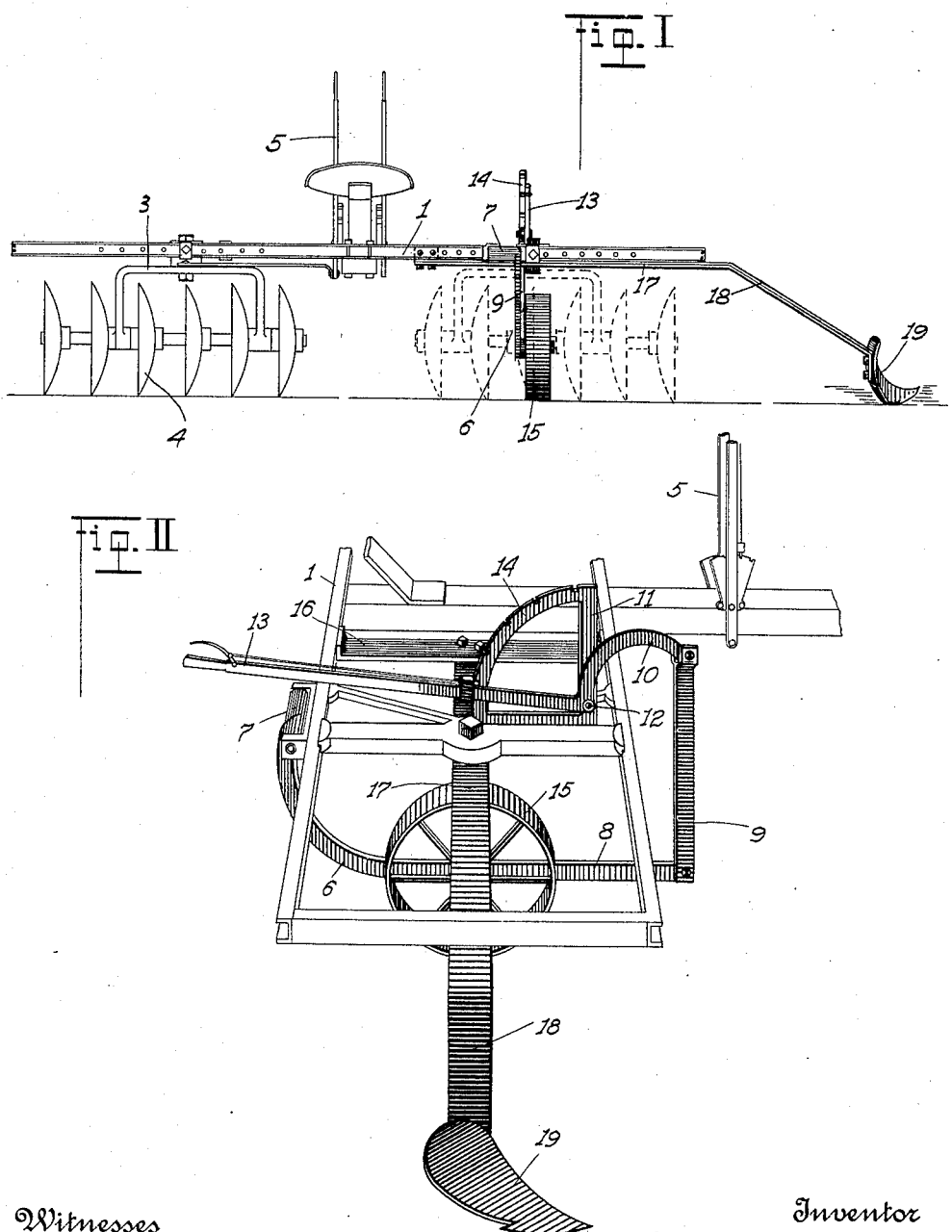

UNITED STATES PATENT OFFICE.

EDWARD ALDERS, OF FARMINGTON, CALIFORNIA.

EXTENSION PLOW ATTACHMENT FOR CULTIVATORS.

1,007,764.  Specification of Letters Patent.  Patented Nov. 7, 1911.

Application filed March 21, 1911.  Serial No. 615,968.

*To all whom it may concern:*

Be it known that I, EDWARD ALDERS, a citizen of the United States, residing at Farmington, in the county of San Joaquin, State of California, have invented certain new and useful Improvements in Extension Plow Attachments for Cultivators; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to farm implements, particularly to cultivators used in orchards and vineyards and like places, the object of the invention being to produce a combination cultivator and plow which will have a lateral extension arm carrying a plow adapted to plow in close to the vines or trees without injuring or breaking the young or tender shoots and still permit of the cultivating operation in conjunction therewith.

A further object of the invention is to produce a simple and inexpensive device, and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 1 is a rear elevation of my improved cultivator showing the extension plow thereon. Fig. 2 is a perspective view of one end of the cultivator to which the extension plow is attached.

Referring now more particularly to the characters of reference on the drawings, 1 designates the main frame of the cultivator having on one side the usual frame 3 adapted to carry the cultivator disks 4, such frame being adapted to be turned in any direction desired by means of a lever connection 5. On the other side of the frame 1, instead of having the cultivator disks as shown by dotted lines, I provide a curving bar 6 fulcrumed a 7 to the frame 1 and curving underneath such frame 1 to the front side thereof, at which point there is a link 9 connecting the same with a lever 10 fulcrumed on a quadrant frame 11 as at 12 and having an operating handle 13 moving over a graduated member 14 on the quadrant 11, whereby the frame 6 may be raised or lowered to any point desired. Such frame 6 carries a supporting wheel 15 adapted to support that side of the frame 1.

Disposed across the frame 1 is a cross bar 16 to which is bolted a horizontal bar 17 having a bent outer end 18 projecting a distance beyond the outer end of the frame 1 and having a bent end 18 carrying a plow share 19, which plow share will work in underneath the vines and close to the bodies thereof without injuring or breaking light and tender shoots therefrom and this plow can be made to dig at a greater or less depth by lowering or raising the wheel 15 in the manner shown and described.

From the foregoing description it will readily appear that I have produced such a device as will substantially fulfil the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

A cultivator comprising the combination of a frame, cultivators carried on one side of said frame, a bar fulcrumed on the other side of said frame at the rear thereof, and curving underneath said frame to the front thereof, a link on said bar, an operating lever connected with said link and fulcrumed on said frame, a wheel carried by said bar, a cross bar on said frame, a longitudinal bar bolted to said cross bar and projecting beyond the end of said frame, and a plow share carried by said longitudinal bar on its outer end, as described.

In testimony whereof I affix my signature in presence of two witnesses.

EDWARD ALDERS.

Witnesses:
PERCY S. WEBSTER,
JOSHUA B. WEBSTER.

Copies of this patent may be obtained for five cents each, by addressing the "Commissioner of Patents, Washington, D. C."